US012790856B2

(12) United States Patent
Park et al.

(10) Patent No.: US 12,790,856 B2
(45) Date of Patent: Nov. 10, 2026

(54) DOOR LOCK DEVICE

(71) Applicant: AUTONICS CORPORATION, Busan (KR)

(72) Inventors: Jaesu Park, Busan (KR); Byungwha Jung, Busan (KR)

(73) Assignee: AUTONICS CORPORATION, Busan (KR)

( * ) Notice: Subject to any disclaimer, the term of this patent is extended or adjusted under 35 U.S.C. 154(b) by 308 days.

(21) Appl. No.: 18/682,812

(22) PCT Filed: Aug. 11, 2022

(86) PCT No.: PCT/KR2022/011972
§ 371 (c)(1),
(2) Date: Feb. 9, 2024

(87) PCT Pub. No.: WO2023/018240
PCT Pub. Date: Feb. 16, 2023

(65) Prior Publication Data

US 2024/0352768 A1 Oct. 24, 2024

(30) Foreign Application Priority Data

Aug. 12, 2021 (KR) ........................ 10-2021-0106841

(51) Int. Cl.
*E05B 47/00* (2006.01)

(52) U.S. Cl.
CPC .. *E05B 47/0004* (2013.01); *E05B 2047/0016* (2013.01); *E05B 2047/0085* (2013.01)

(58) Field of Classification Search
CPC ......... E05B 47/0004; E05B 2047/0016; E05B 2047/0085; E05B 11/00; E05B 17/226; E05B 2047/0024; E05B 2047/0067; E05B 47/0603; E05B 2047/0086; E05B 15/04; E05B 65/00; E05B 15/0295; E05B 47/02; E05B 2015/0403; E05B 47/00; F16P 3/08;
(Continued)

(56) References Cited

U.S. PATENT DOCUMENTS 6,483,053 B2 11/2002 Kajio et al.
7,223,927 B2 * 5/2007 Poyner ................ H01H 27/007 200/325
(Continued)

FOREIGN PATENT DOCUMENTS

| | | | |
|---|---|---|---|
| CN | 106437313 | A | 2/2017 |
| JP | 3639934 | B2 | 4/2005 |
| JP | 2008-303699 | A | 12/2008 |

(Continued)

*Primary Examiner* — Lheiren Mae A Caroc
(74) *Attorney, Agent, or Firm* — Birch, Stewart, Kolasch & Birch, LLP

(57) ABSTRACT

The door lock device includes a body, a solenoid including a bobbin on which a coil is wound, and a plunger that is elongated to have a portion exposed to an outside of the solenoid and configured to be magnetized by the coil so as to slide inside the bobbin, the solenoid being disposed in the body, a first slider into which the portion of the plunger exposed to the outside of the solenoid is inserted, the first slider being configured to move in a sliding direction of the plunger, and a first elastic member having a first end supported by the plunger and a second end supported by the first slider.

17 Claims, 18 Drawing Sheets

(58) Field of Classification Search
CPC ... E05Y 2999/00; E05Y 2900/132; E05F 1/08
See application file for complete search history.

(56) References Cited

U.S. PATENT DOCUMENTS

| | | | | |
|---|---|---|---|---|
| 2009/0045037 | A1* | 2/2009 | Poyner | H01H 27/007 200/43.11 |
| 2010/0270816 | A1 | 10/2010 | Yuan | |

FOREIGN PATENT DOCUMENTS

| | | | |
|---|---|---|---|
| JP | 4396542 | B2 | 1/2010 |
| KR | 10-2014-0027708 | A | 3/2014 |
| KR | 10-1959753 | B1 | 7/2019 |
| WO | WO 2007/066803 | A1 | 6/2007 |

* cited by examiner

[FIG. 1]
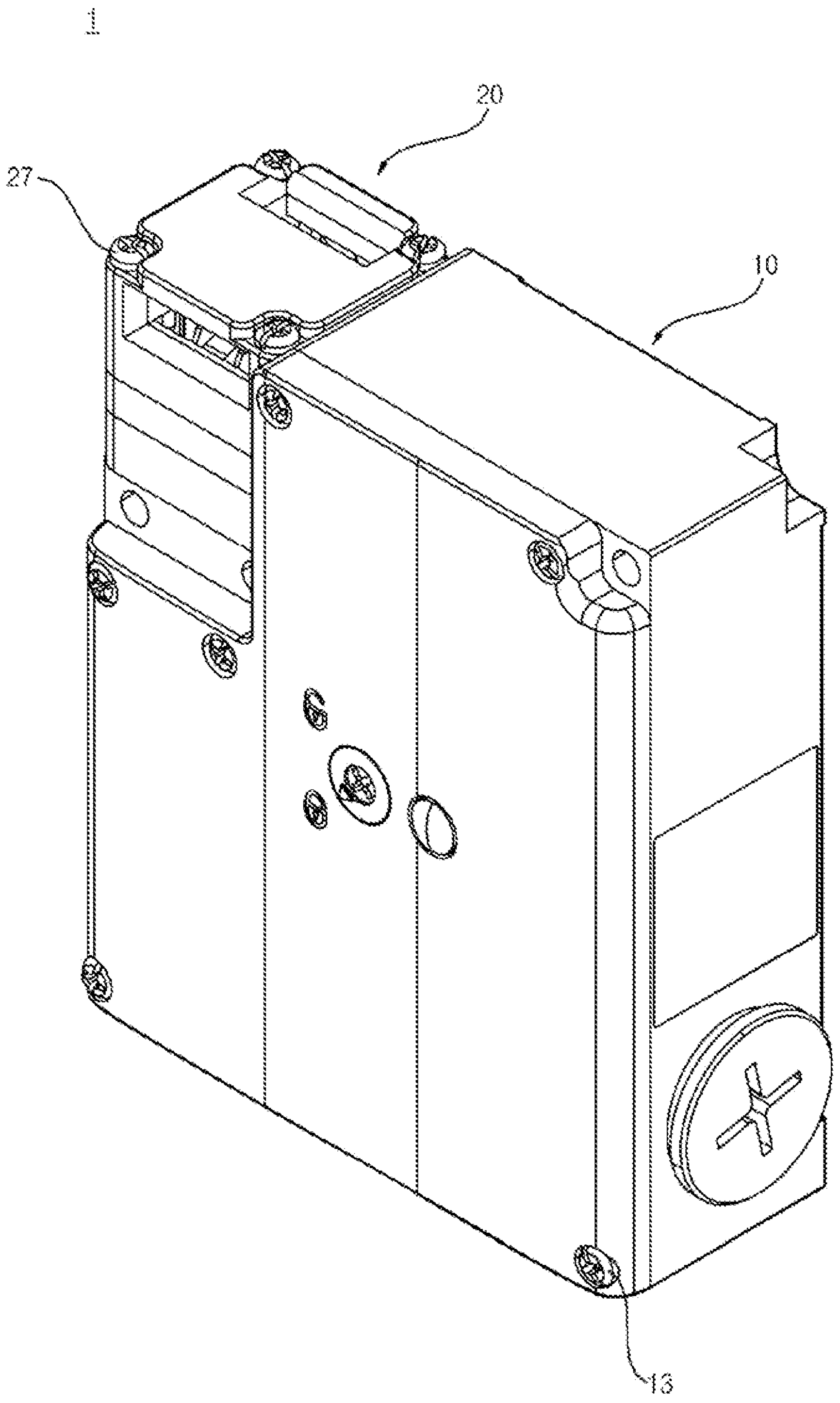

[FIG. 2]
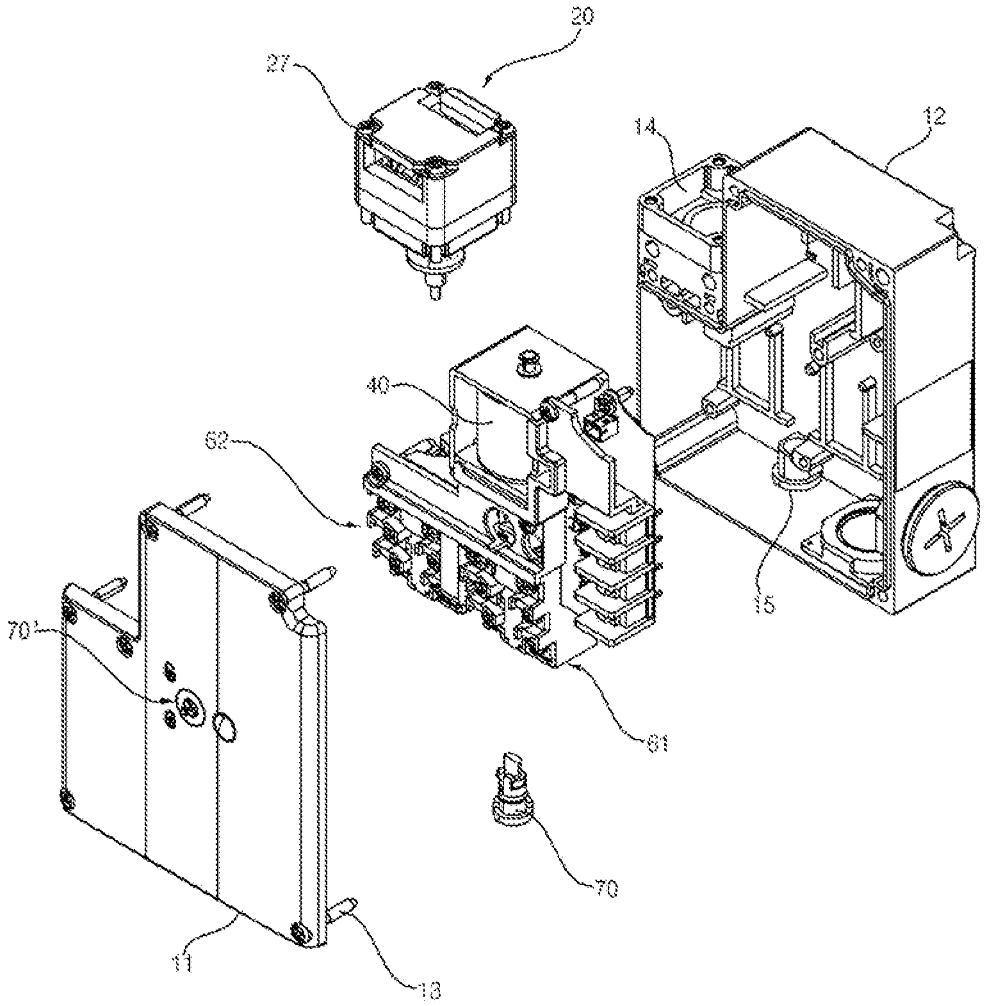

[FIG. 3]
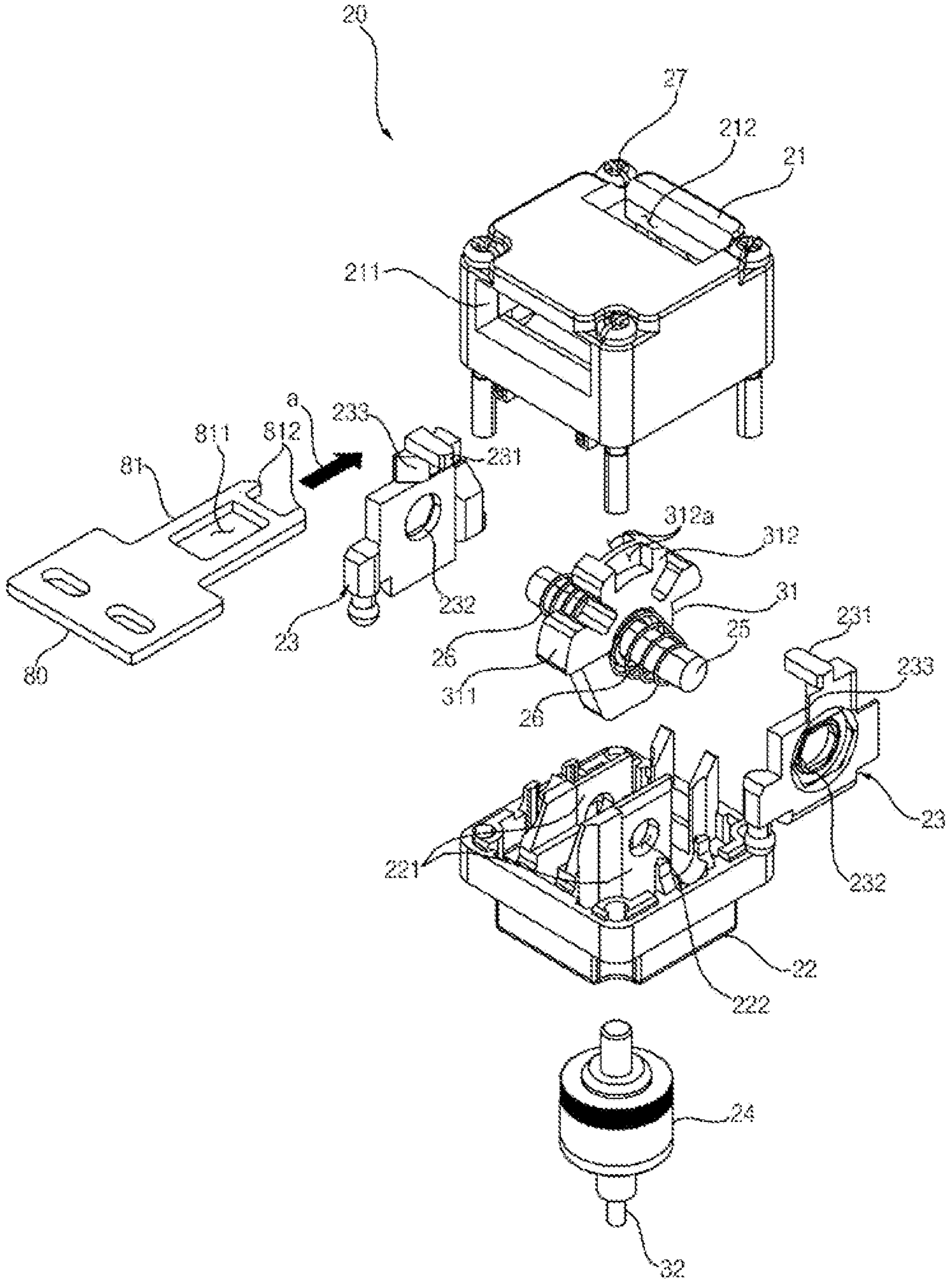

[FIG. 4a]
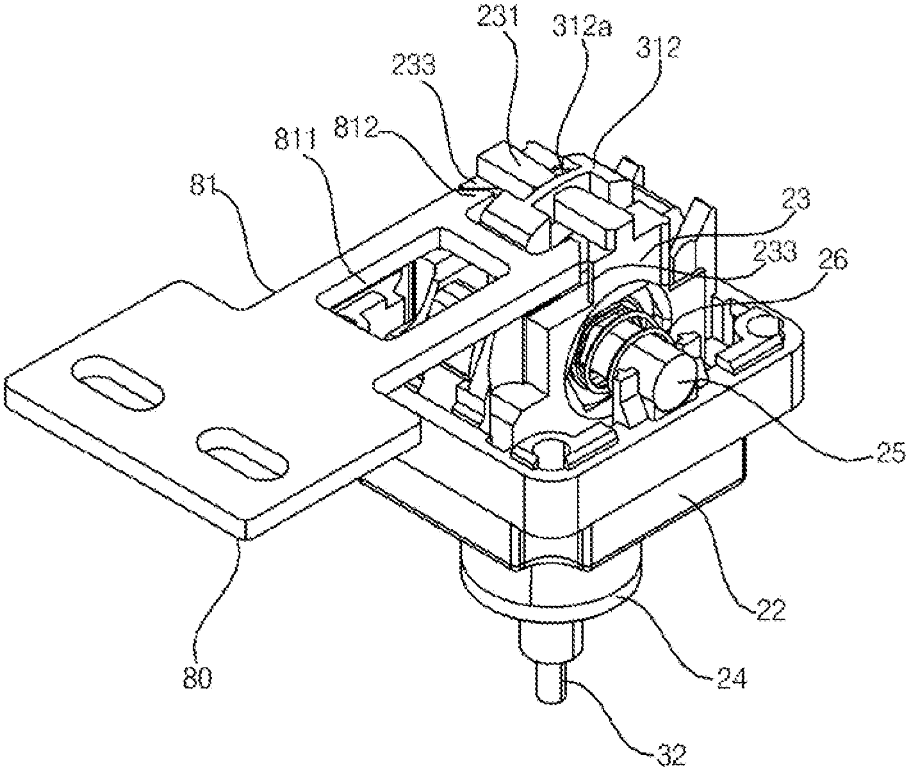

[FIG. 4b]
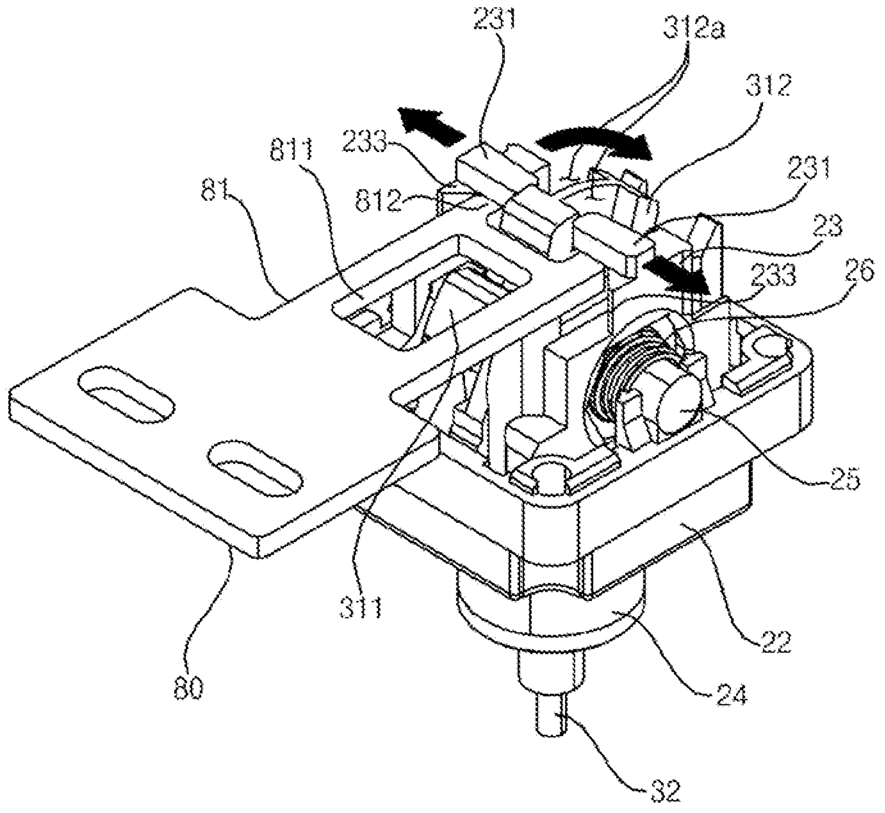

[FIG. 5]
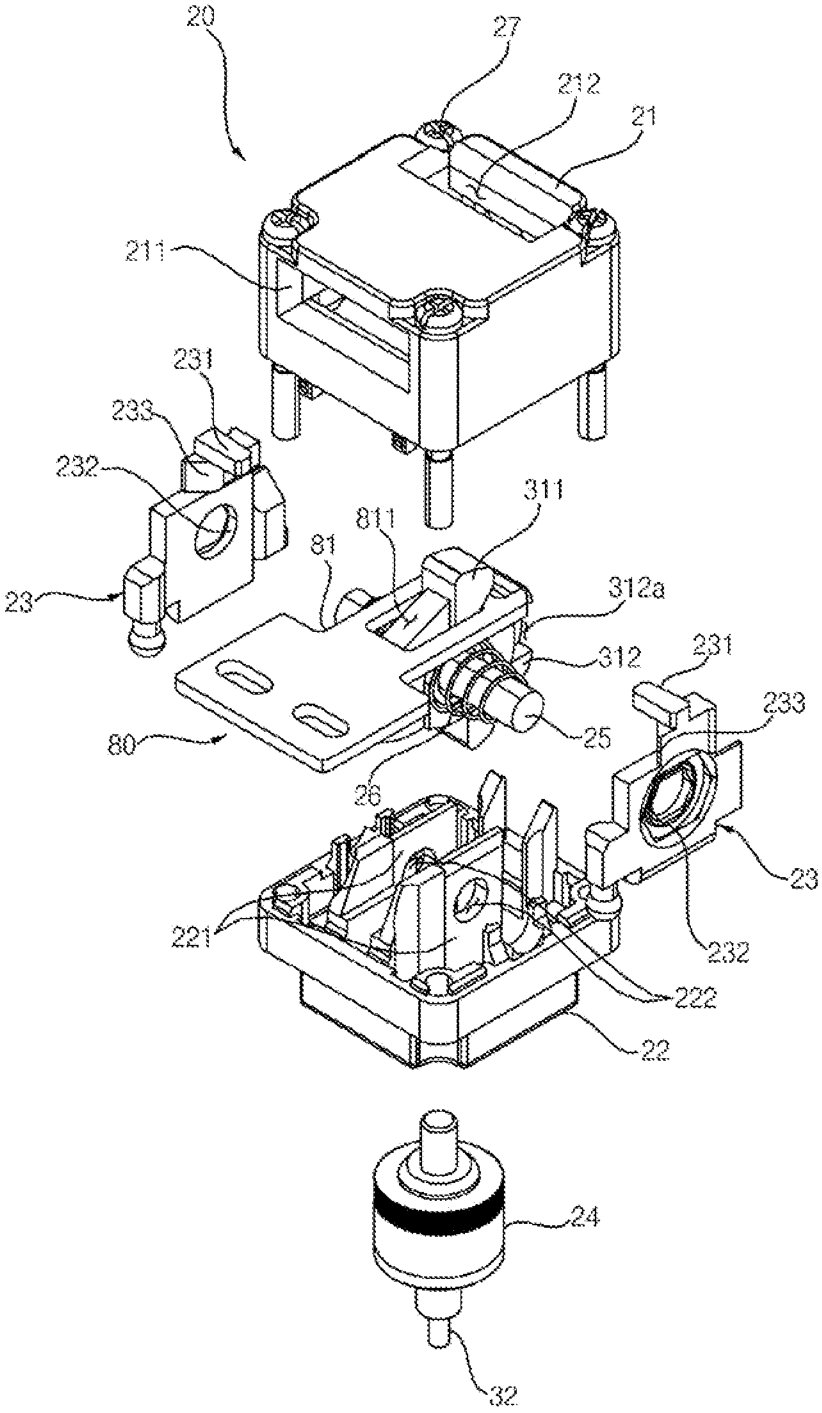

[FIG. 6]
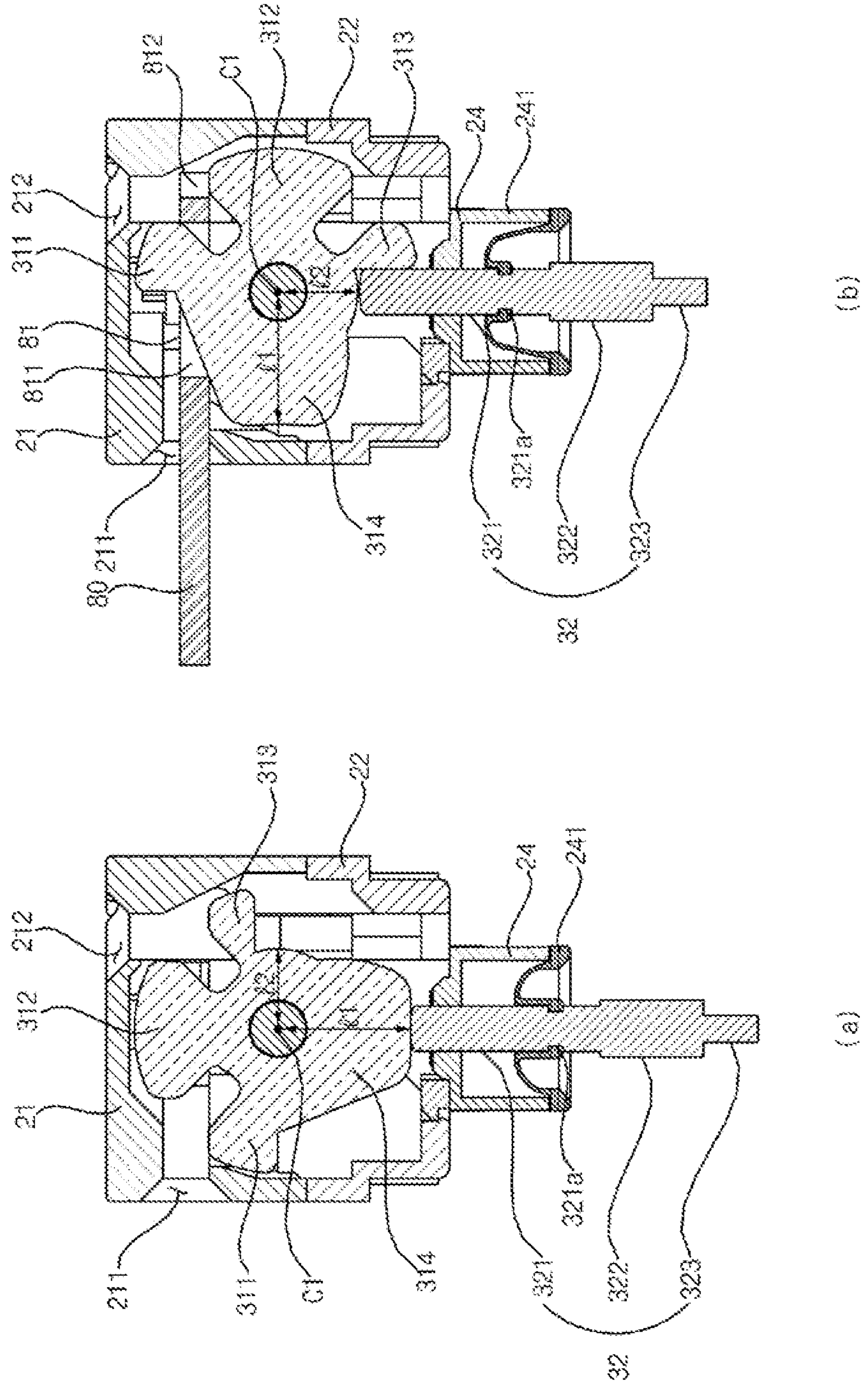

[FIG. 7a]
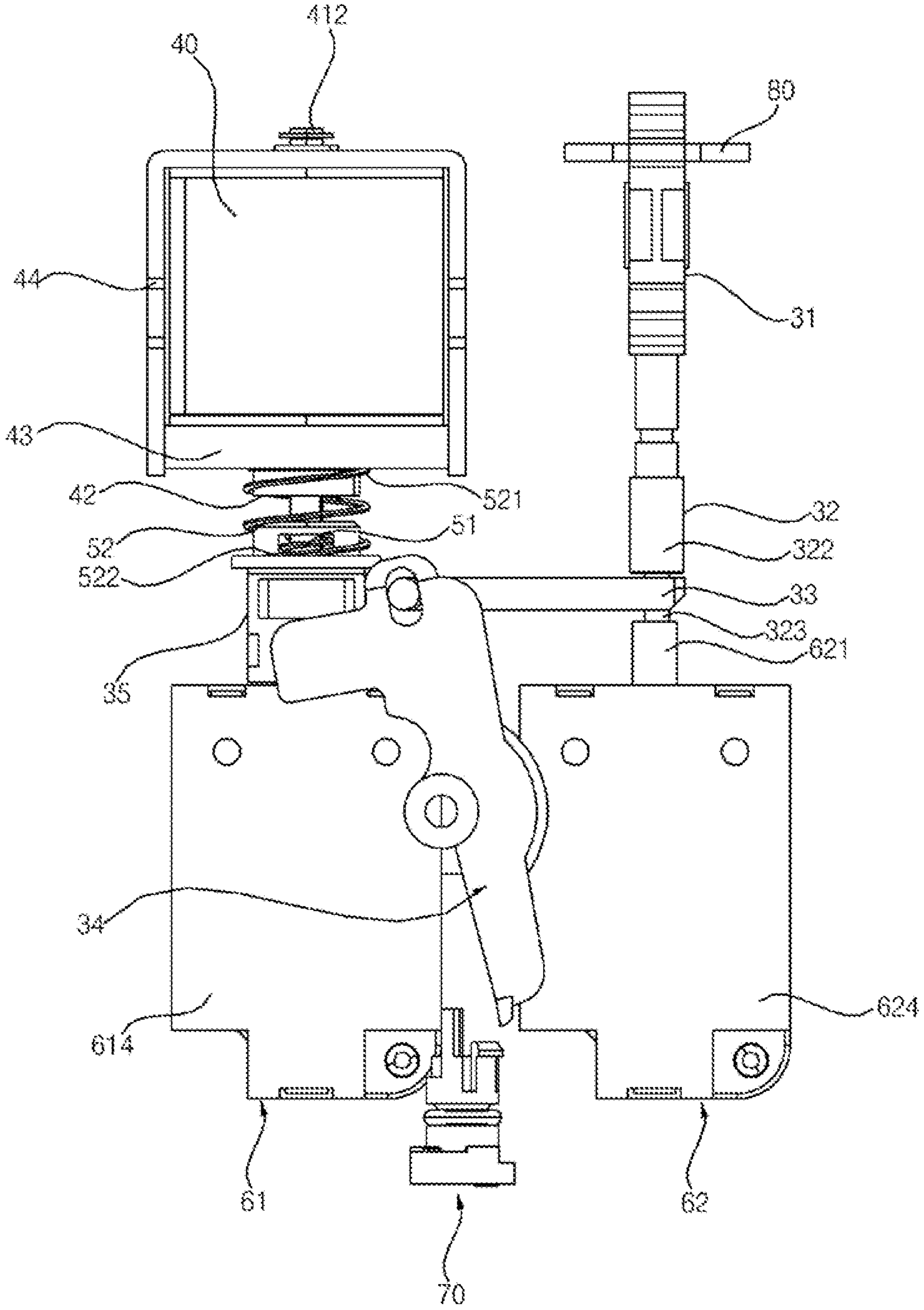

[FIG. 7b]
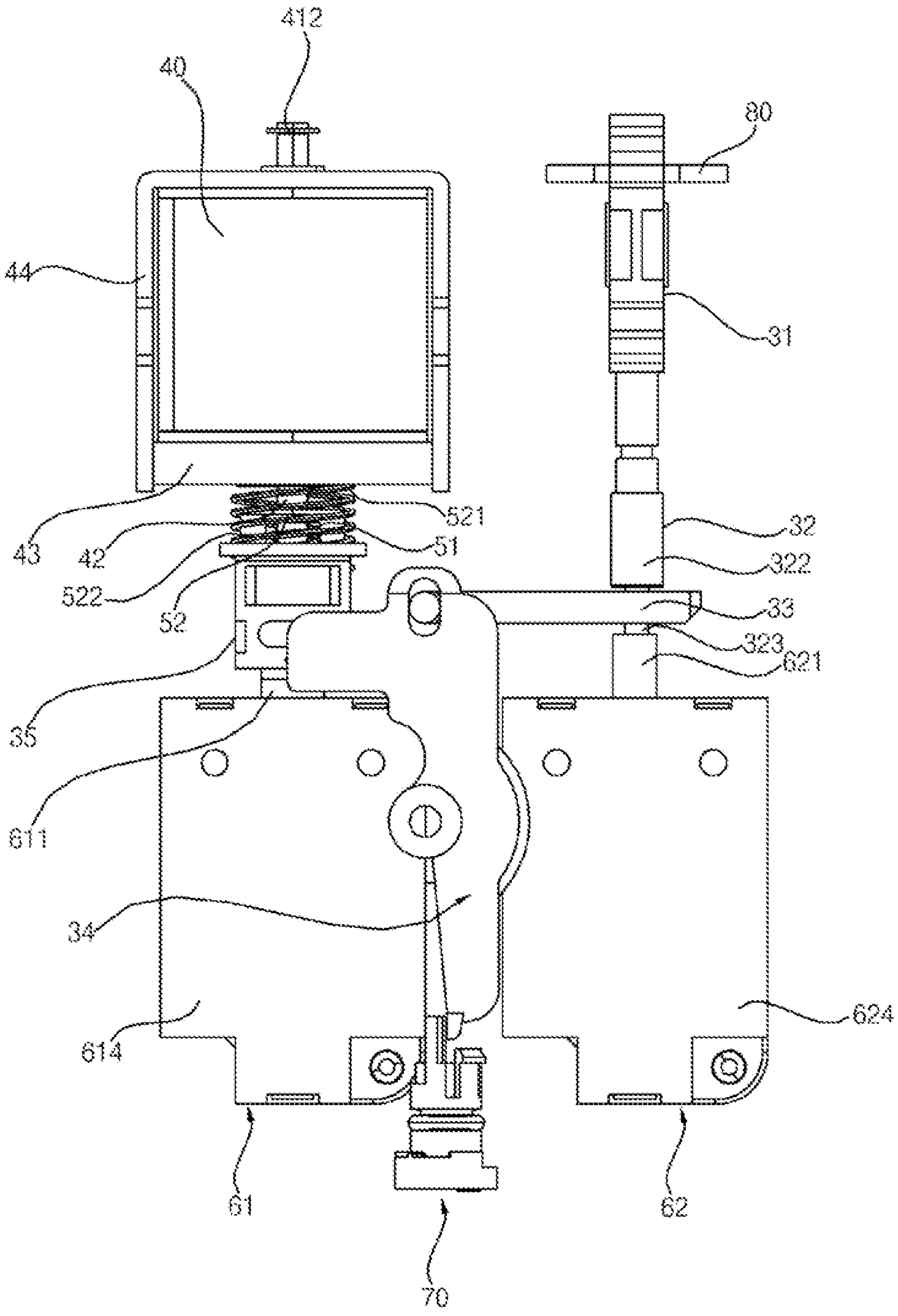

[FIG. 8a]
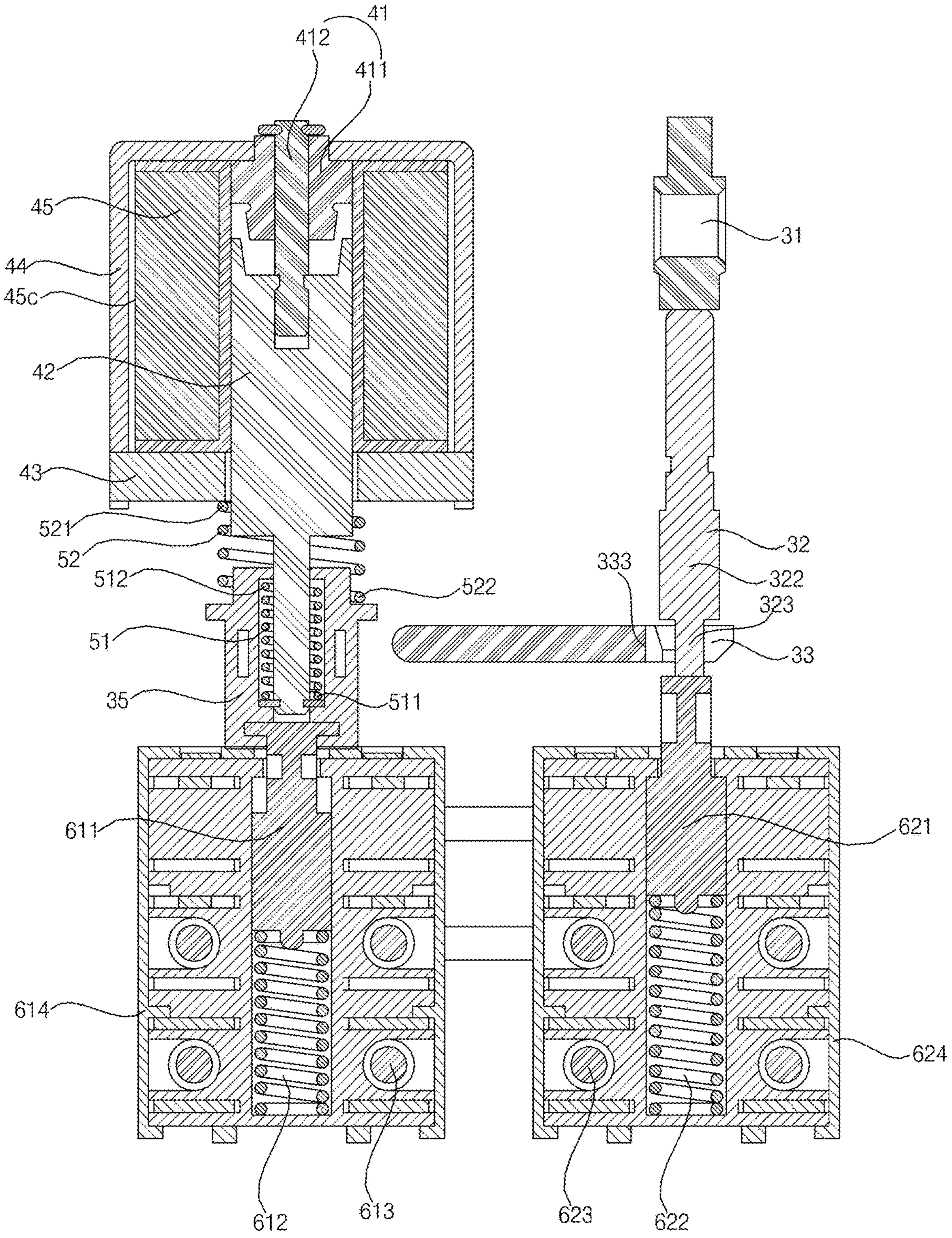

[FIG. 8b]
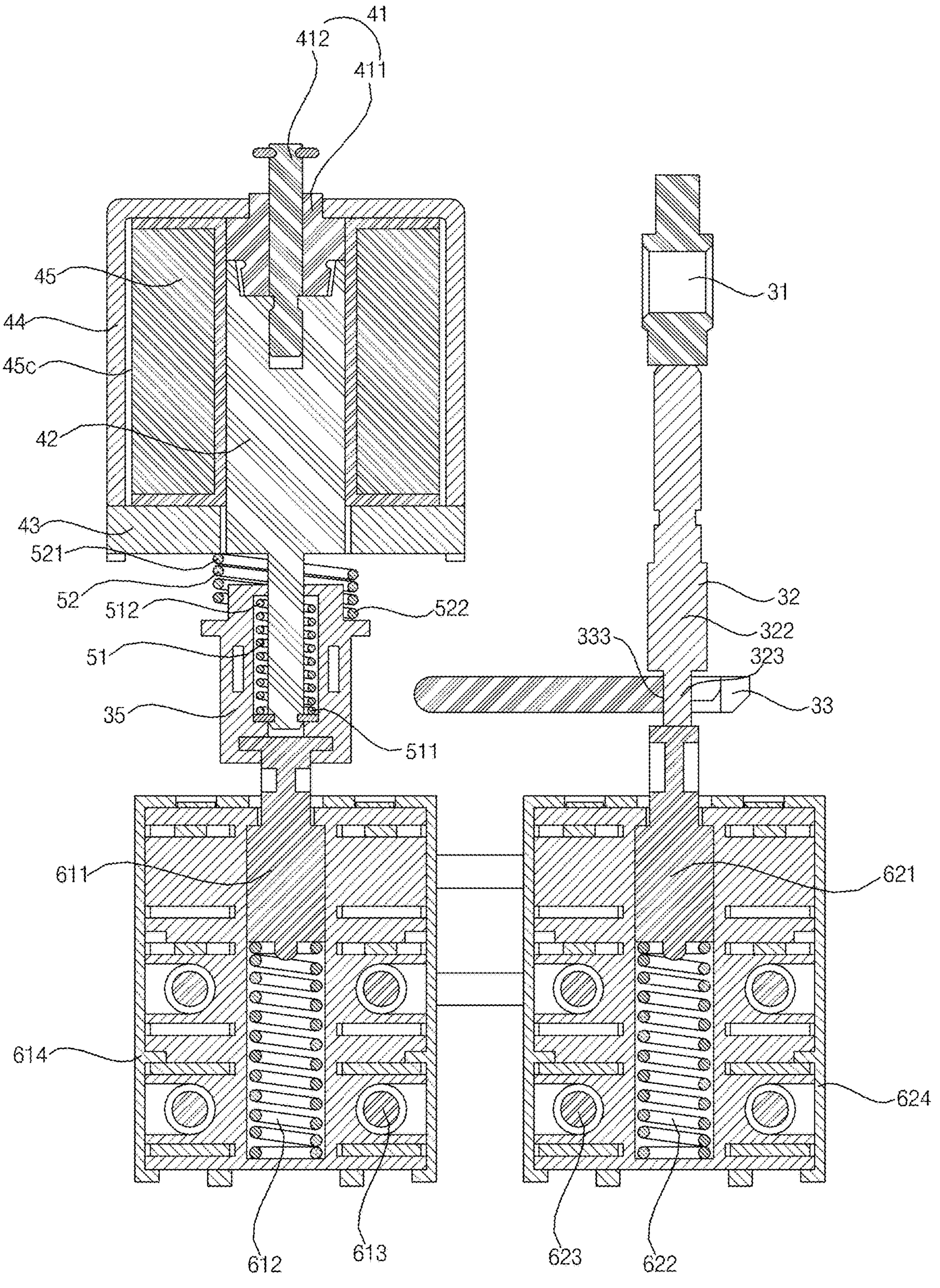

[FIG. 9a]
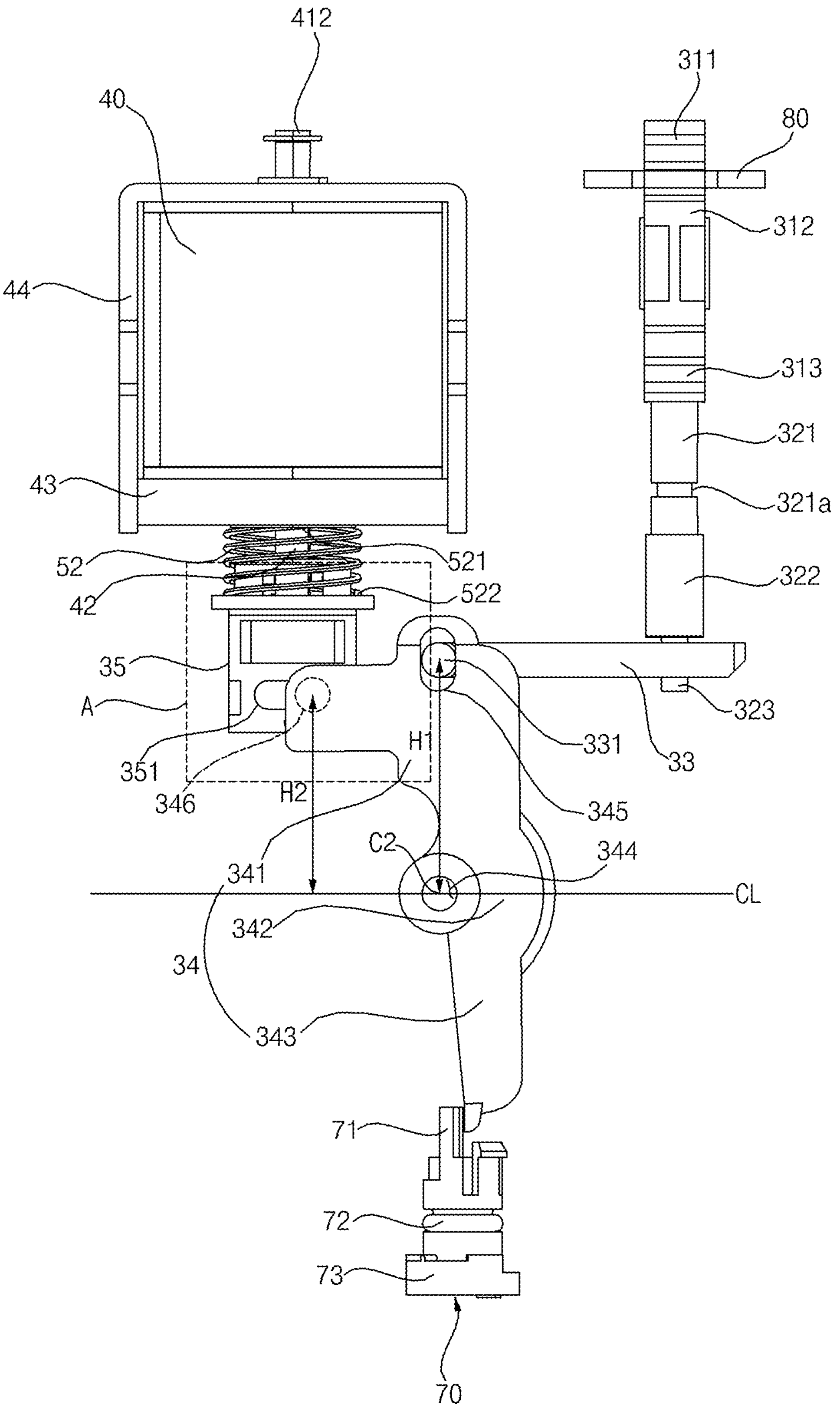

[FIG. 9b]
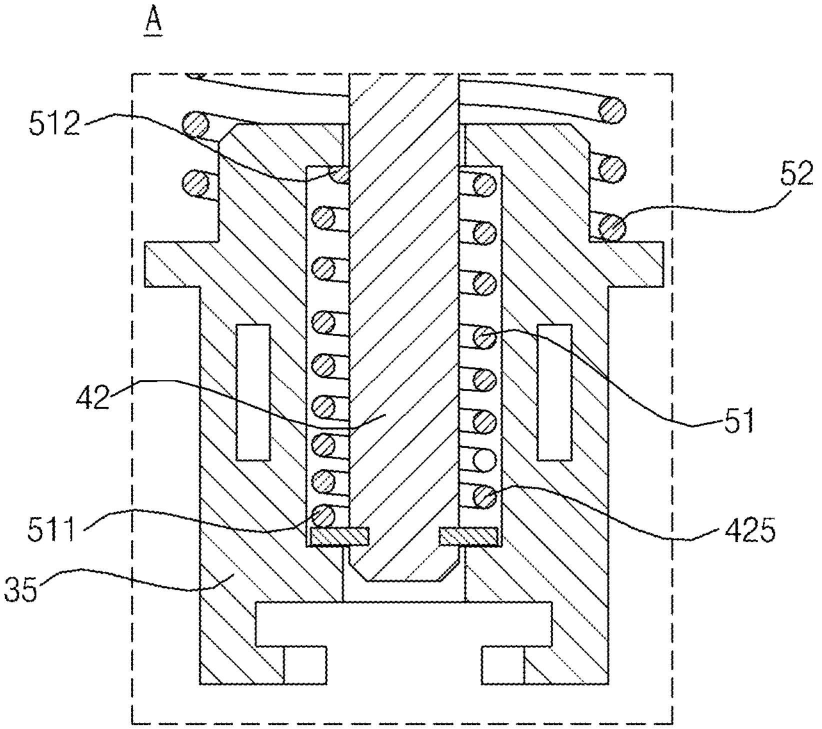

[FIG. 9c]
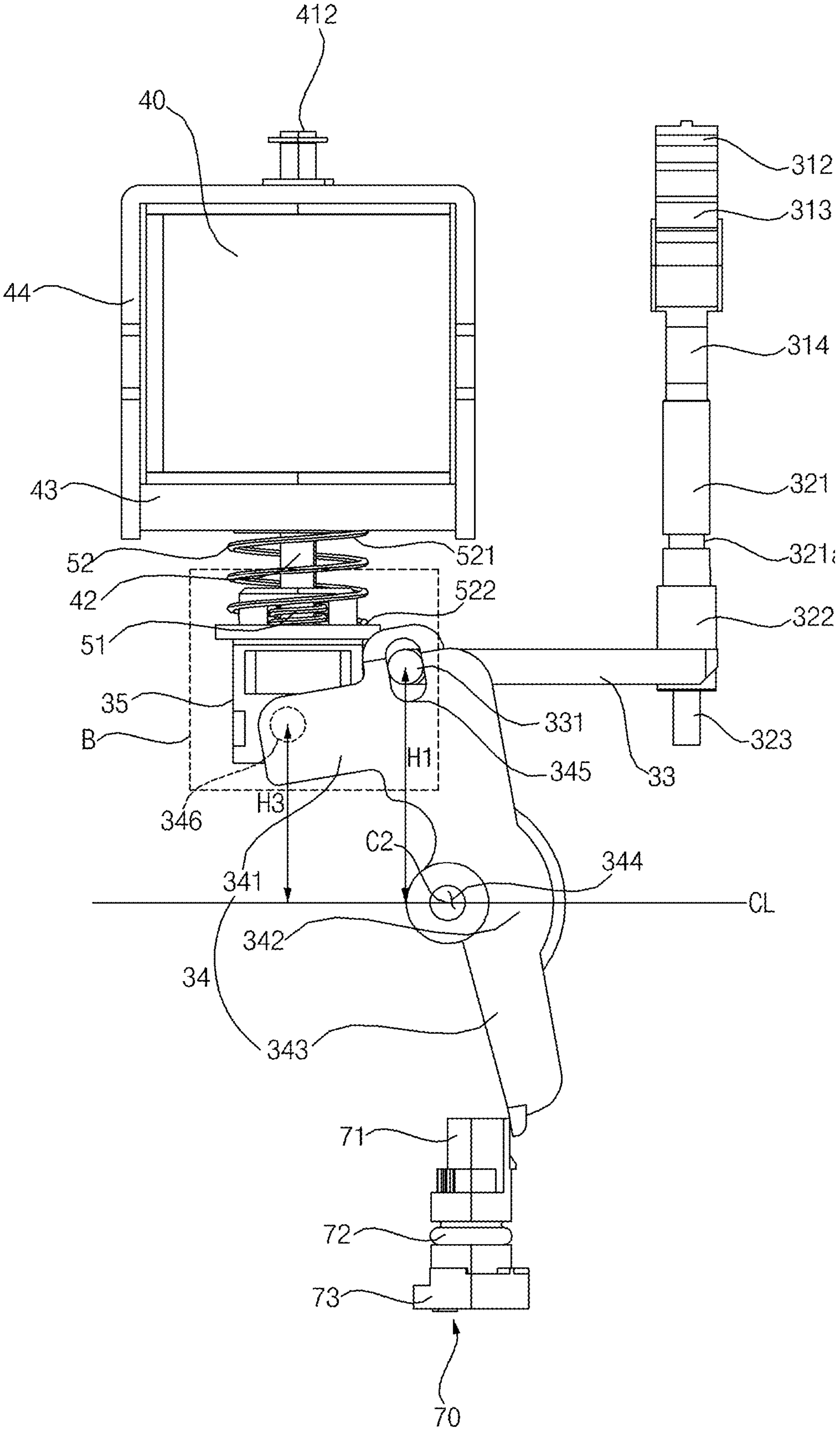

[FIG. 9d]
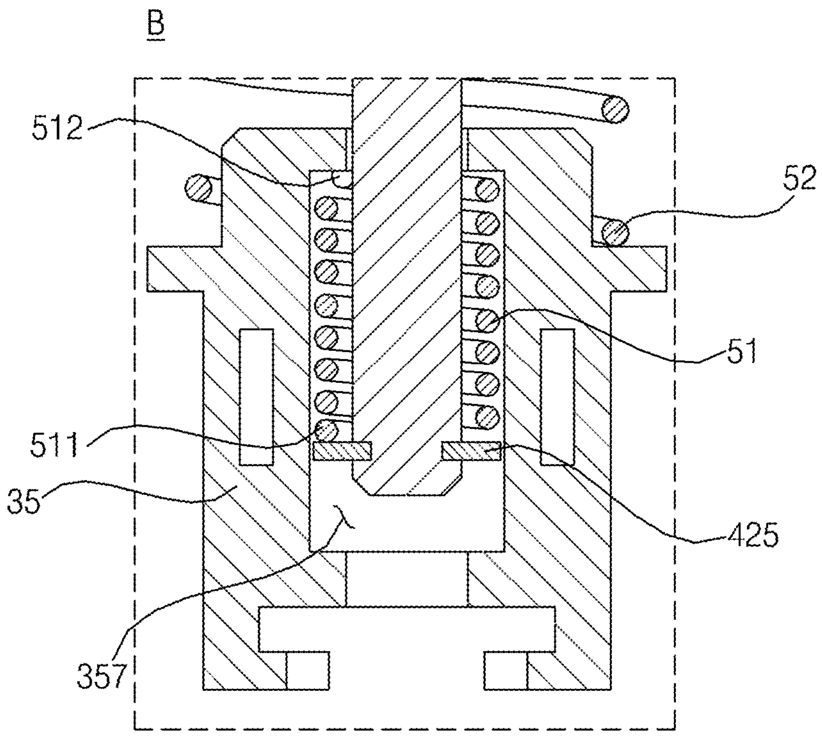

[FIG. 10]
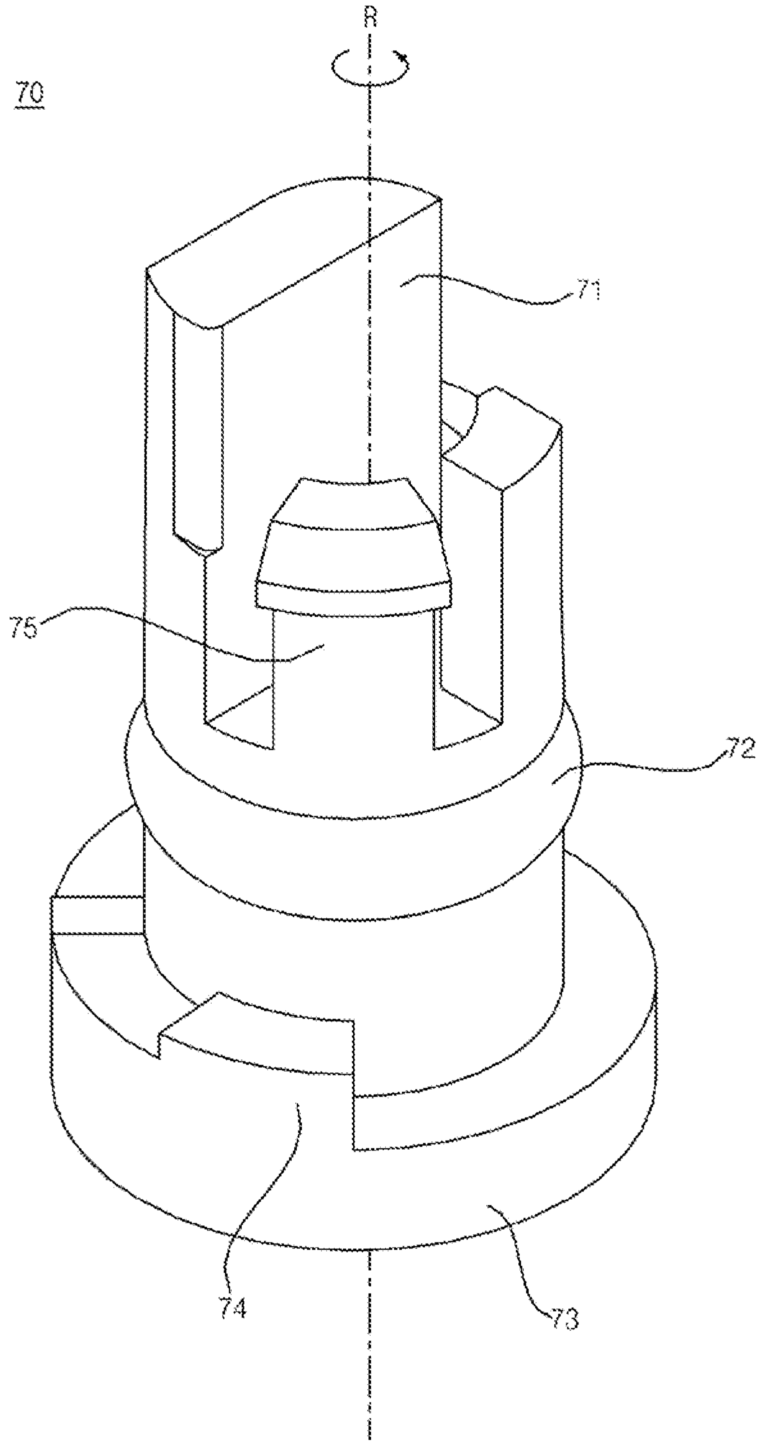

[FIG. 11]
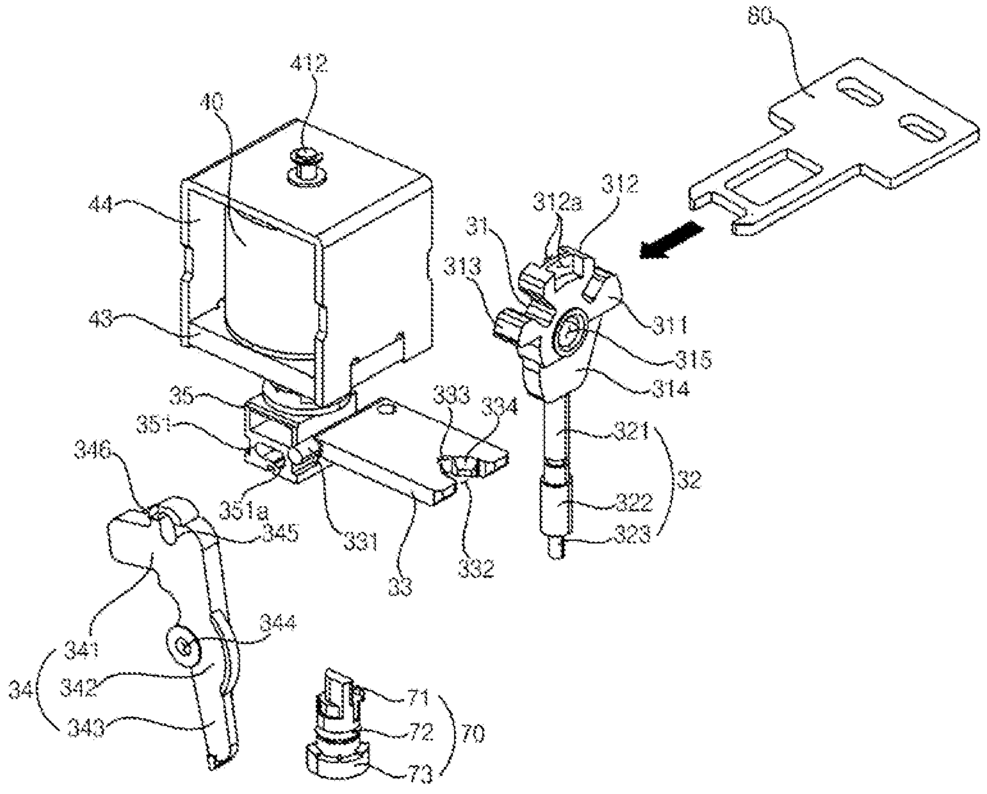

[FIG. 12]
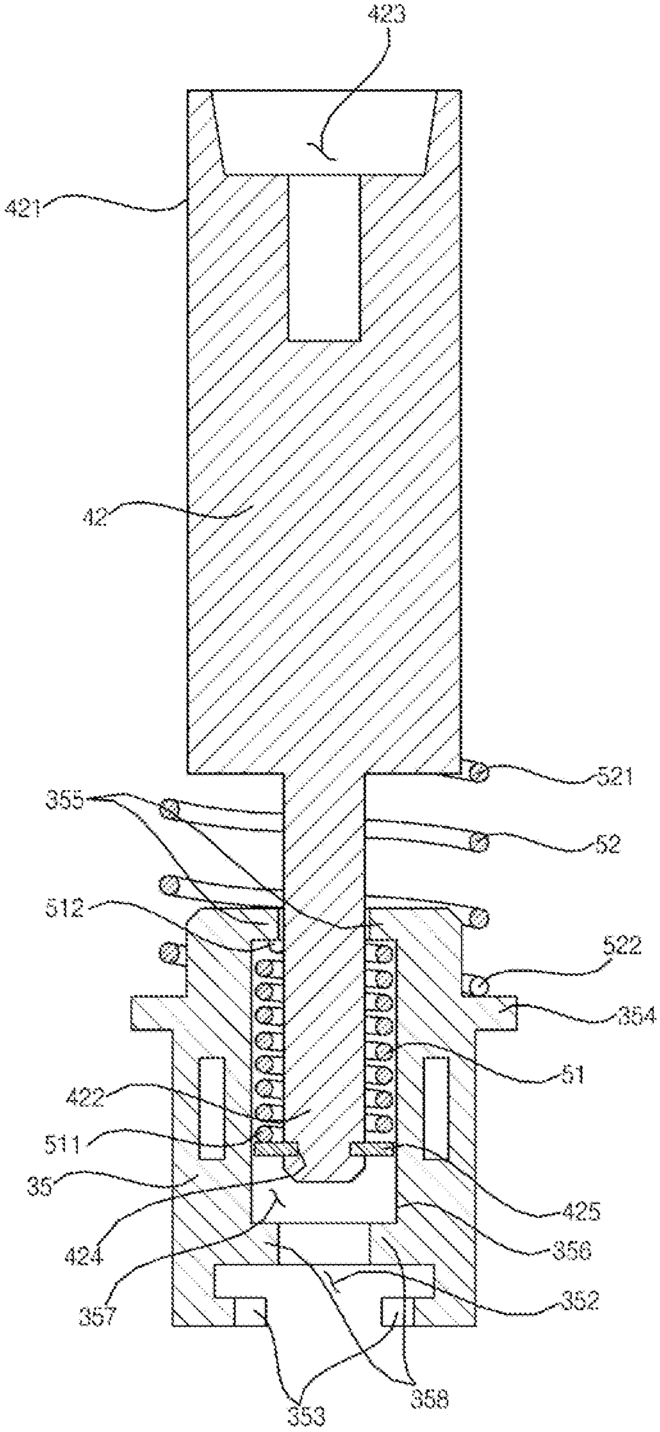

DOOR LOCK DEVICE

CROSS REFERENCE TO RELATED APPLICATIONS

This application is the National Phase of PCT International Application No. PCT/KR2022/011972, filed on Aug. 11, 2022, which claims priority under 35 U.S.C. 119 (a) to Patent Application No. 10-2021-0106841, filed in the Republic of Korea on Aug. 12, 2021, all of which are hereby expressly incorporated by reference into the present application.

TECHNICAL FIELD

The present disclosure relates to a door lock device.

BACKGROUND ART

A door lock device is intended to improve the security and method of locking or unlocking a door through a button key, a card key and fingerprint recognition using a solenoid, an unlock key, or other access authorization means. Recently, numerous research has been conducted on this door lock device.

A door lock device is a mechanism installed in a machine designed to not only open and close the door of the machine, but also to ensure the safety of an operator by keeping the door of the machine locked when a source of hazard of the machine is operating and allowing the door to be opened only when the operation of the hazard source is stopped.

Meanwhile, when there is a need to forcibly unlock a door lock device due to a power failure or an emergency situation, a release key can be used to manually unlock the door lock device.

DISCLOSURE OF INVENTION

Technical Problem

It is an objective of the present disclosure to solve the above and other problems.

It is another objective of the present disclosure to provide a door lock device that can be unlocked with less force by causing a spring to stretch without directly separating a plunger and a core of a solenoid from each other.

It is yet another objective of the present disclosure to provide a door lock device that can be unlocked by transferring force in a direction opposite to a magnetic force acting between a plunger and a core.

Solution to Problem

According to an aspect of the subject matter described in this application, a door lock device includes: a body; a solenoid comprising a bobbin on which a coil is wound, and a plunger that is elongated to have a portion exposed to an outside of the solenoid and configured to be magnetized by the coil so as to slide inside the bobbin, the solenoid being disposed in the body; a first slider into which the portion of the plunger exposed to the outside of the solenoid is inserted, the first slider being configured to move in a sliding direction of the plunger; and a first elastic member having a first end supported by the plunger and a second end supported by the first slider.

Advantageous Effects of Invention

According to at least one of the embodiments of the present disclosure, it is possible to reduce the force required to unlock a door lock device.

According to at least one of the embodiments of the present disclosure, it is possible to minimize deformation or damage to components of a door lock device.

Further scope of applicability of the present disclosure will become apparent from the following detailed description. However, it should be understood that the detailed description and specific embodiments such as preferred embodiments of the present disclosure are given by way of example only, since various changes and modifications within the idea and scope of the present disclosure may be clearly understood by those skilled in the art.

BRIEF DESCRIPTION OF DRAWINGS

FIGS. 1 to 12 are diagrams illustrating examples of a door lock device according to embodiments of the present disclosure.

MODE FOR INVENTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In the following description, a suffix such as "module" and "unit" may be used to refer to elements or components. Use of such a suffix herein is merely intended to facilitate description of the specification, and the suffix itself is not intended to give any special meaning or function.

In the present disclosure, that which is well known to one of ordinary skill in the relevant art has generally been omitted for the sake of brevity. The accompanying drawings are used to help easily understand the technical idea of the present disclosure and it should be understood that the idea of the present disclosure is not limited by the accompanying drawings. The idea of the present disclosure should be construed to extend to any alterations, equivalents, and substitutes besides the accompanying drawings.

It will be understood that although the terms "first", "second", etc. may be used herein to describe various elements, these elements should not be limited by these terms. These terms are only used to distinguish one element from another.

It will be understood that when a component is referred to as being "connected to" or "coupled to" another component, it may be directly connected to or coupled to another component, or intervening components may be present. In contrast, when a component is referred to as being "directly connected to" or "directly coupled to" another component, there are no intervening components present.

As used herein, a singular representation is intended to include a plural representation unless the context clearly indicates otherwise.

Referring to FIGS. 1 and 2, a door lock device 1 may include a body 10, a head 20, fastening members 13, 27, a solenoid 40, a first terminal assembly 61, a second terminal assembly 62, and a release 70.

The body 10 may include a first part 11, a second part 12 coupled to the first part 11, a fastening member 13 to fasten the first part 11 to the second part 12, and a base 14 disposed outside the body 10. The first part 11 may define a front surface of the body 10. The second part 12 may define a rear surface and a side surface of the body 10. The first part 11 and the second part 12 may include a plurality of holes into which the fastening members 13 are inserted. The second part 12 may be coupled to the first part 11 to define an outer shape of the body 10. The second part 12 may include a recessed portion 15 in which the release 70 is installed. The base 14 may be disposed at the second part 12.

The recessed portion 15 may be formed in the second part 12 by being recessed into the second part 12. The release 70 may pass through the recessed portion 15 to be inserted into the body 10. The recessed portion 15 may accommodate at least a portion of the release 70. The recessed portion 15 may accommodate the entirety of the release 70, so that the release 70 may not be exposed to an outside of the recessed portion 15.

The head 20 may be mounted on the base 14. The head 20 may be mounted on an outside of the body 10. The fastening member 27 may couple the head 20 to the base 14. The head 20 may be detachable from the body 10. Alternatively, the head 20 may be integrally formed with the body 10. An inside of the head 20 may be connected to an inside of the body 10. Outer surfaces of the head 20 and the body 10 may form a continuous surface. The head 20 may have an end connected to the second terminal assembly 62. The head 20 may function as a locking device through which a key 80 (see FIG. 3) is inserted and taken out.

The solenoid 40 may be supported by the inside of the body 10. The solenoid 40 may be installed inside the body 10. The solenoid 40 may be connected to the first terminal assembly 61. The solenoid 40 may be connected to a battery (not shown) in the body 10 or an external power source.

The first terminal assembly 61 and the second terminal assembly 62 may be installed inside the body 10. The first terminal assembly 61 may be connected to the head 20. The second terminal assembly 62 may be connected to the solenoid 40. The first terminal assembly 61 may detect whether or not the key 80 is inserted into the head 20. The second terminal assembly 62 may detect whether or not the solenoid 40 is operating.

The release 70, 70' may be installed at the body 10. The release 70, 70' may be installed on the side surface, the front surface, and/or the rear surface of the body 10. The release 70, 70' may be positioned in the body 10. A user may insert an additional structure to operate the release 70, 70' installed in the body 10.

The release 70, 70', which is a means for manually unlocking the door lock device 1, may be used to eject the key 80 from the head 20 when the solenoid 40 malfunctions or there is an urgent need to unlock the door lock device 1.

Meanwhile, the release 70, 70' may be configured such that a portion thereof is inserted into the body 10, and a remaining portion thereof is exposed to the outside of the body 10. A user may hold the exposed portion of the release 70, 70' to operate the release 70, 70'. Alternatively, the release 70, 70' may be implemented in a fully automatic manner that does not require the force by the user, and the release 70, 70' may be operated by inserting an additional structure into the body 10 without being exposed to the outside of the body 10.

Referring to FIG. 3, the head 20 of the door lock device 1 may include a cap 21, a bottom 22, a stopper 23, a holder 24, a shaft 25, a spring 26, a cam 31, and a rod 32.

The key 80 may be inserted into the door lock device 1. The key 80 may include an insertion portion 81 inserted into the head 20. The insertion portion 81 may include a hole 811 formed therein and a tip 812 protruding from a distal end portion thereof. The key 80 may be inserted into the head 20 through a slot 211 of the head 20.

The cap 21 may include a slot (211, 212) through which an inside and an outside of the head 20 communicate with each other. A plurality of slots 211 and 212 may be provided. Opening directions of the plurality of slots 211 and 212 may form a predetermined angle. For example, the opening directions of the plurality of slots 211 and 212 may be perpendicular to each other. Due to the plurality of slots 211 and 212, the key 80 may be inserted into the head 20 and may be taken out of the head 20.

The slot 211, 212 may decrease in width toward the inside of the head 20. The cap 21 may include a plurality of holes into which the fastening members 27 are inserted. The cap 21 may be coupled to the bottom 22. The cap 21 may cover the bottom 22.

The bottom 22 may include a wall 221. The wall 221 may include a hole 222 through which the shaft 25 passes. The wall 221 may be provided in plurality. The wall 221 may support the cam 31. The wall 221 may prevent the cam 31 from moving along the shaft 25. The plurality of walls 221 may be disposed at symmetrical positions with respect to the cam 31. The wall 221 may be mounted on the bottom 22, or may be integrally formed with the bottom 22. The wall 221 integrally formed with the bottom 22 may protrude from the bottom 22 toward the inside of the head 20. The wall 221 may have a flat surface.

The stopper 23 may include a protrusion 231 and an inclined surface 223. The stopper 23 may be disposed inside the head 20. The stopper 23 may be supported by the bottom 22. The stopper 23 may include a hole 232 through which the shaft 25 passes. The stopper 23 may be provided in plurality. The plurality of stoppers 23 may be disposed at symmetrical positions with respect to the cam 31. The wall 221 may be positioned between the stopper 23 and the cam 31. The stopper 23 may be fitted to the spring 26. The stopper 23 may suppress the rotation of the cam 31.

The protrusion 231 may protrude from an end of the stopper 23. The protrusion 231 may extend in a longitudinal direction of the shaft 25. The protrusion 231 may be inserted into a groove 312*a* of the cam 31. As the protrusion 231 is inserted into the groove 312*a*, the rotation of the cam 31 may be suppressed.

The inclined surface 233 may be formed on a portion of the stopper 23 adjacent to the slot 211, 212. The inclined surface 233 may face the slot 211, 212. The inclined surface 233 may be inclined in a direction intersecting an insertion direction a of the key 80. The key 80 inserted through the slot 211 may slide on the inclined surface 233. The inclined surface 233 may contact the tip 812 of the inserted key 80. The inclined surface 233 may intersect the insertion direction a of the key 80. The inclined surface 233 may be formed flat. The tip 812 may include a surface corresponding to the inclined surface 233.

The holder 24 may be disposed on a lower surface of the bottom 22. The holder 24 may support the rod 32. The holder 24 may be mounted to the base 14. The holder 24 may support the head 20. The rod 32 may be disposed inside the holder 24. The holder 24 may have an overall cylinder shape.

The shaft 25 may be disposed in the head 20. The shaft 25 may provide the axis of rotation for the cam 31. The shaft 25 may pass through the cam 31. The shaft 25 may be mounted on the bottom 22. The stopper 23, the wall 221, and the cam 31 may be arranged on the shaft 25. The shaft 25 may pass through the spring 26.

A first end of the spring 26 may be fixed to the shaft 25, and a second end of the spring 26 may be fixed to the cam 31. The spring 26 may connect the cam 31 and the shaft 25. The shaft 25 may be disposed inside the spring 26. The spring 26 may provide a restoring force to the cam 31 rotated on the shaft 25. The spring 26 may provide a restoring force to the stopper 23 moved in the longitudinal direction of the shaft 25. A plurality of springs 26 may be provided. The stopper 23 may be inserted into each of the plurality of springs 26.

Meanwhile, the spring 26 may be a tapered spring whose diameter gradually deceases toward an end of the shaft 25. Accordingly, as a distance from a center of rotation of the cam 31 to a point where the second end of the spring 26 is fixed increases, a large moment (of force) may be transferred to the cam 31.

The cam 31 may rotate on the shaft 25. The cam 31 may include a first tooth 311 and a second tooth 312 that protrude from its peripheral surface. The cam 31 may include a groove 312*a* formed at a position spaced apart from the shaft 25. The groove 312*a* of the cam 31 may be formed in the second tooth 312. The protrusion of the stopper 23 may be accommodated in the groove 312*a*. The cam 31 may be inserted between the plurality of walls 221. The peripheral surface of the cam 31 may be supported by the rod 32.

A process of inserting the key 80 into the head 20 will be described with reference to FIGS. 3 to 5.

The key 80 may be inserted into the head 20 through the slot 211 of the cap 21.

The tip 812 of the insertion portion 81 inserted into the head 20 may come into contact with the inclined surface 223, causing the stopper 23 to be pushed in the longitudinal direction of the shaft 25. As the stopper 23 moves in a direction away from the cam 31, the spring 26 may be compressed, so that the protrusion 231 of the stopper 23 may be drawn out of the groove 312*a* of the second tooth 312. The insertion portion 81 of the key 80 may push the second tooth 312 of the cam 31. As the protrusion 231 of the stopper 23 is drawn out, the cam 31 may rotate.

When the key 80 is inserted until the hole 811 of the insertion portion 81 is positioned within the head 20, the first tooth 311 of the rotated cam 31 may be engaged in the hole 811 of the insertion portion 81. The first tooth 311 may suppress the inserted key 80 from being drawn out. Once the key 80 is inserted, the stopper 23 may maintain a state of being moved in the longitudinal direction of the shaft 25.

Referring to FIG. 6, the door lock device 1 may include a second operating unit (31, 32), which includes the cam 31 and the rod 32, and an elastic body 241.

The second operating unit (31, 32) may be disposed in the head 20. The second operating unit (31, 32) may be operated by the key 80. The second operating unit (31, 32) may be operated when the key 80 is inserted into the head 20 or is taken out of the head 20.

The cam 31 may include a rotation center C1, a first tooth 311, a second tooth 312, a third tooth 313, and a nose 314. The cam 31 may be disposed in the head 20. The cam 31 may have the rotation center C1 provided by the shaft 25. The cam 31 may have a predetermined radius 12. The first tooth 311, the second tooth 312, the third tooth 313, and the nose 314 may protrude from the peripheral surface of the cam 31.

The first tooth 311 may be disposed between the slot 211 and the shaft 25. The first tooth 311 may be positioned between the second tooth 312 and the nose 314 on the circumference with respect to the rotation center C1 of the cam 31. When the key 80 is inserted into the head 20, the first tooth 311 may be engaged in the hole 811 of the inserted key 80.

The first tooth 311 may not overlap the slot 211 in the opening direction of the slot 211, namely, in the insertion direction a (see FIG. 3) of the key 80. In other words, the first tooth 311 may be spaced apart from the slot 211 in a direction intersecting the opening direction of the slot 211. Thus, when the key 80 is inserted through the slot 211, interference may not occur between the key 80 and the first tooth 311.

The second tooth 312 may be aligned with the slot 211 in the opening direction of the slot 211. The second tooth 312 may be positioned between the first tooth 311 and the third tooth 313 on the circumference with respect to the rotation center C1 of the cam 31. When the key 80 is inserted through the slot 211, the second tooth 312 may come into contact with the key 80.

Meanwhile, the second tooth 312 may not overlap the slot 212 in the opening direction of the slot 212. In other words, the second tooth 312 may be spaced apart from the slot 212 in a direction intersecting the opening direction of the slot 212. As the second tooth 312 is not located on the insertion path of the key 80, it may not cause interference between the key 80 and the second tooth 312 when the key 80 is inserted into the head 20.

The third tooth 313 may be aligned with the slot 212 in the opening direction of the slot 212. The third tooth 313 may be positioned between the second tooth 312 and the nose 314 on the circumference with respect to the rotation center C1 of the cam 31. When the key 80 is inserted into the head 20, the third tooth 313 may come into contact with a lateral surface of the rod 32. The third tooth 313 may allow the rod 32 to remain upright.

The nose 314 may be positioned between the first tooth 311 and the third tooth 313 on the circumference with respect to the rotation center C1 of the cam 31. The nose 314 may come into contact with the rod 32. The nose 314 may have a flat distal end. The distal end of the nose 314 may be spaced apart from the rotation center C1 of the cam 31 by a predetermined distance 11.

The distance I1 from the rotation center C1 of the cam 31 to the nose 314 may be greater than the predetermined radius 12 of the cam 31. When the cam 31 rotates, the rod 32 may slide along the nose 314 and the peripheral surface the cam 31. Therefore, due to a difference between the distance I1 from the rotation center C1 of the cam 31 to the nose 314 and the radius I2 of the cam 31, the rod 32 may perform a linear motion in a longitudinal direction of the rod 32 when the cam 31 rotates.

The rod 32 may include a first part 321, a second part 322, and a third part 323. The lateral surface of the rod 32 may be supported by the holder 24. The rod 32 may have an elongated stick shape. The rod 32 may have an end supported by the cam 31. The lateral surface 32 of the rod 32 may be supported by the head 20.

The first part 321 may pass through the holder 24. A lateral surface of the first part 321 may be supported by the holder 24. The first part 321 may have the shape of a cylinder with a predetermined diameter D1. The first part 321 may come into contact with the cam 31 or the nose 314. The first part 321 may have a ring groove 321*a* on its peripheral surface. The elastic body 241 may be inserted into the ring groove 321*a* of the first part 321.

The second part 322 may connect the first part 321 and the third part 323. The second part 322 may have the shape of a cylinder with a predetermined diameter D2. Alternatively, the second part 322 may have the shape of a column with a polygonal cross section. A first end of the second part 322 may be connected to the first part 321, and a second end of the second part 322 may be connected to the third part 323.

Meanwhile, the predetermined diameter D2 of the second part 322 may be greater than the predetermined diameter D1 of the first part 321. Due to the difference in diameter between the first part 321 and the second par 322, a first step may be formed between the first part 321 and the second part 322. Thus, even when the elastic body 241 is separated from the ring groove 321 and slides toward the second part 322, excessive sliding of the elastic body 241 may be suppressed by the first step.

The third part 323 may be connected to the second part 322. The third part 323 may have the shape of a cylinder with a predetermined diameter D3. The predetermined diameter D3 of the third part 323 may be less than the predetermined diameter D2 of the second part 322. Due to the difference in diameter between the third part 323 and the second part 322, a second step may be formed between the third part 323 and the second part 322. Thus, although the rod 32 moves excessively in its longitudinal direction, the second step may suppress the excessive movement of the rod 32.

The elastic body 241 may be disposed at the holder 24. The elastic body 241 may be inserted into the ring groove 321*a* to surround the lateral surface of the first part 321. The elastic body 241 may provide a restoring force to the first part 321. When the first part 321 moves in the longitudinal direction of the rod 32, the elastic body 241 may provide a restoring force in a direction opposite to a moving direction of the first part 321.

Meanwhile, when the key 80 is inserted through the slot 212, the key 80 may push the third tooth 313, and the second tooth 312 may be engaged in the hole 811 of the inserted key 80. A user may vary the insertion direction of the key 80 as necessary, the compatibility of the door lock device 1 may be enhanced.

Meanwhile, when a user removes the key 80 from the head 20, the cam 31 may rotate in a direction opposite to when the key 80 is inserted, the rod 32 may move in the longitudinal direction, and the first part 321 of the rod 32 may slide along the peripheral surface of the cam 31 to thereby come into contact with the nose 314. That is, in order to allow the key 80 to be drawn out of the head 20, the rod 32 should be movable in the longitudinal direction. Thus, when the movement of the rod 32 is inhibited, the user 80 may not be able to remove the key 80 from the head 20. This may allow the door lock device 1 to achieve a locking function of maintaining the operating state of the solenoid 40.

A case in which the solenoid 40 of the door lock device 1 operates normally will be described with reference to FIGS. 7A, 7B, 8A, and 8B. When the solenoid 40 operates normally, the key 80 may be drawn out of the head 20 while power is not applied to the solenoid 40.

FIG. 7A illustrates that power is not applied to the solenoid 40, and FIG. 7B illustrates that power is applied to the solenoid 40. FIG. 8A is a cross-sectional view of FIG. 7A, and FIG. 8B is a cross-sectional view of FIG. 8A.

The door lock device 1 may include a second operating unit (31, 32), a first operating unit (33, 34, 35), a solenoid 40, a first elastic member 51, a second elastic member 52, a first terminal assembly 61, and a second terminal assembly 62.

The first operating unit (33, 34, 35) may include a second slider 33, an arm 34, and a first slider 35. The first operating unit (33, 34, 35) may be disposed in the body 10. The first operating unit (33, 34, 35) may be interlocked with the second operating unit (31, 32). The first operating unit (33, 34, 35) may be interlocked with the solenoid 40. The first operating unit (33, 34, 35) may be operated when power is applied to the solenoid 40. When the power is applied to the solenoid 40, the second operating unit (31, 32) may be engaged with the first operating unit (33, 34, 35).

The second slider 33 may support the rod 32 of the second operating unit (31, 32). The second slider 33 may be elongated in a direction intersecting the longitudinal direction of the rod 32. For example, the second slider 33 may be elongated in a direction perpendicular to the longitudinal direction of the rod 32. When power is applied to the solenoid 40 while the key 80 is inserted (see FIG. 7B and FIG. 8B), the second slider 33 may support a lateral surface of the third part 323, and may suppress longitudinal movement of the second part 322.

The second slider 33 may have therein a notch 332 (see FIG. 11). The third part 323 of the rod 32 may be accommodated in the notch 332 of the second slider 33. When power is not applied to the solenoid 40 while the key 80 is inserted (see FIG. 7A and FIG. 8A), the third part 323 may be accommodated in the notch 332 of the second slider 33 and may be spaced apart from the second slider 33.

When the solenoid 40 operates normally, a user may remove the key 80 from the head 20 regardless of the actuation of the release 70 (see FIG. 7A and FIG. 8A).

The arm 34 may be elongated. The arm 34 may be connected to the second slider 33. The arm 34 may have an end supported by the release 70. The arm 34 may serve as a link connecting the second slider 33 and the first slider 35. The arm 34 may have therein a rotation center C2 (see FIG. 9A). When the arm 34 rotates about the rotation center C2, the second slider 33 and the first slider 25 that are connected to the arm 34 may move together.

The first slider 35 may be connected to the arm 34. The first slider 35 may be interlocked with a plunger 42. The first slider 35 may move in a direction parallel to a sliding direction of the plunger 42. A portion of the plunger 42 may be inserted into the first slider 35. The first slider 35 may be interlocked with the first terminal assembly 61. The first slider 35 may perform a linear motion in a longitudinal direction of the plunger 42.

Meanwhile, the first slider 35 may move in a direction in which the plunger 42 slides. That is, as movement directions of the plunger 42 and the first slider 35 are parallel, it may allow the first slider 35 to fully transfer the force to the plunger 42.

The solenoid 40 may include a core 41, the plunger 42, a bottom 43, a cover 44, and a bobbin 45. The solenoid 40 may be connected to an external power source or a battery (not shown) in the door lock device 1.

The core 41 may be disposed inside the solenoid 40. The core 41 may include a first part 411 and a second part 412 configured to slide inside the first part 411. The first part 411 may be fixed inside the solenoid 40. The second part 412 may be coupled to the plunger 42 so as to be moved integrally with the plunger 42. The first part 411 may include a metal material. A magnetic force may act between the magnetized plunger 42 and the first part 411.

The plunger 42 may be made of a magnetic material. The plunger 42 may be elongated. A portion of the plunger 42 may be positioned at an outside of the solenoid 40. The portion of the plunger 42 may be exposed to the outside of the solenoid 40. The plunger 42 may be coupled to the second part 412 of the core 41. The plunger 42 may be magnetized by a coil 45*c* in the bobbin 45. The magnetized plunger 42 may slide inside the bobbin 45. When power is applied to the solenoid 40, the plunger 42 may be magnetized, and the magnetized plunger 42 may attract the first part 411 of the core 41.

Thus, when power is applied to the solenoid 40, the plunger 42 may abut the first part 411, such that the second part 412 of the core 41 that is coupled to the plunger 42 may protrude further to the outside of the solenoid 40. By contrast, when power is not applied to the solenoid 40, since no attractive force exists between the plunger 42 and the first part 411, the plunger 42 may be spaced apart from the first part 411.

The bottom 43 may support the bobbin 45. The bottom 43 may define a lower surface of the solenoid 40. The bottom 43 may protect the inside of the solenoid 40. The plunger 42 may slide inside the bottom 43.

The cover 44 may define an outer shape of the solenoid 40. The cover 44 may be disposed outside the bobbin 45. The cover 44 may be coupled to the bottom 43. The cover 44 may protect the bobbin 45. The core 41 may be exposed to the outside of the solenoid 40 through a hole formed in the cover 44.

A coil 45*c* may be wound inside the bobbin 45. The bobbin 45 may be disposed inside the solenoid 40. The coil 45*c* inside the bobbin 45 may be electrically connected to an external power source or the battery. When power is applied to the solenoid 40, a plurality of coils 45*c* inside the bobbin 45 may form a magnetic field. The plunger 42 may slide inside the bobbin 45.

The first elastic member 51 may be disposed in the first slider 35. The first elastic member 51 may have a first end 511 supported by the plunger 42 and a second end 512 supported by the first slider 35. When the plunger 42 and the first slider 35 move in directions away from each other, the first elastic member 51 may be compressed.

The second elastic member 52 may have a first end 521 supported by the bottom 43 of the solenoid 40 and a second end 522 supported by the first slider 35. When power is applied to the solenoid 40, the first slider 35 may move toward the solenoid 40, causing the second elastic member 52 to be compressed. When the power supplied to the solenoid 40 is cut off, the second elastic member 52 may provide an elastic force to the first slider 35 in a direction that pushes the first slider 35 away from the solenoid 40.

The first terminal assembly 61 may include a piston 611 coupled to the first slider 35, a spring 612 having a first end supported by the piston 611 and a second end supported by a casing 614 to provide a resorting force to the piston 611, a plurality of terminals 613, and the casing 614 in which the piston 611, the spring 612, and the plurality of terminals 613 are accommodated. The first terminal assembly 61 may be interlocked with the solenoid 40 to detect whether or not the solenoid 40 is operating. The plurality of terminals 613 may be connected to a separate first display device such as an LED, and the door lock device 1 may inform, through the first display device, a user whether or not the solenoid 41 is operating.

The second terminal assembly 62 may include a piston 621 interlocked with the rod 32, a spring 622 having a first end supported by the piston 621 and a second end supported by a casing 624 to provide a restoring force to the piston 611, a plurality of terminals 623, and the casing 624 in which the piston 621, the spring 622, and the plurality of terminals 623 are accommodated. The second terminal assembly 62 may be interlocked with the second operating unit (31, 32) to detect whether or not the key 80 is inserted into the head 20. The plurality of terminals 623 may be connected to a separate second display device such as an LED, and the door lock device 1 may inform, through the second display device, a user the insertion/removal of the key 80.

A process of removing the key 80 by using the release 70 when the solenoid 40 malfunctions or in an emergency will be described with reference to FIGS. 9A, 9B, 9C, 9D_and 10.

The arm 34 may include a first part 341, a second part 342, a third part 343, a hole 344, a slot 345, and a cylinder 346.

The first part 341 of the arm 34 may connect the second slider 33 and the first slider 35. The first part 341 may have the slot 345 into which a cylinder 331 of the second slider 33 is inserted. The first part 341 may be provided with the cylinder 346 inserted into a slot 351 of the first slider 35. The second slider 33 and the first slider 35, which move in different directions, may be connected by the first part 341. The first part 341 may be spaced apart from the rotation center C2 of the arm 34.

The slot 345 of the first part 341 of the arm 34 may be elongated in a direction intersecting a longitudinal direction of the second slider 33. The cylinder 331 of the second slider 33 may slide inside the slot 345.

The second part 342 of the arm 34 may have the hole 344 that provides the rotation center C2 of the arm 34. The second part 342 may connect the first part 341 and the third part 343. The second part 342 may be coupled to the first terminal assembly 61 and/or the inside of the body 10. A direction from the rotation center C2 of the second part 342 to the slot 345 of the first part 341 and a distance from the rotation center C2 to the cylinder 346 of the first part 341 may be different from each other.

The third part 343 of the arm 34 may be positioned adjacent to a distal end of the release 70. The third part 343 may be elongated from the second part 342. The third part 343 may have an end supported by the release 70.

The first slider 35 may include a slot 351 on which the cylinder 346 of the arm 34 slides. The slot 351 may be elongated in a direction parallel to the longitudinal direction of the second slider 33. The slot 351 and the second slider 33 may be spaced apart from each other in a direction intersecting the longitudinal direction of the slot 351 or the second slider 33.

Meanwhile, when drawing an imaginary line, namely, a center line CL that passes through the rotation center C2 of the second part 342 and extends in a direction parallel to the longitudinal direction of the second slider 33, a distance H1 from the center line CL to the cylinder 331 of the second slider 33 may be greater than a distance (H2, H3) from the center line CL to the slot 351 of the first slider 35. When the arm 34 rotates, the distance from the center line CL to the slot 351 may be reduced from H2 to H3. Accordingly, the first slider 35 may move in a direction intersecting a moving direction of the second slider 33. That is, the force in the proper direction may be transferred to the first slider 35. In addition, deformation or damage between connected parts may be prevented in the process of transmitting force by the second operating unit (31, 32) and the first operating unit (33, 34, 35).

The release 70 may include a distal end 71, a gasket 72, a knob 73, a stopper 74, a fastening portion 75, and a rotation axis R. FIG. 9A illustrates the release 70 before being operated, and FIG. 9C illustrates the release 70 after being operated.

The distal end 71 of the release 70 may be elongated toward the inside of the body 10. The distal end 71 may be positioned adjacent to the inside of the body 10. The distal end 71 may support the third part 343 of the arm 34. The distal end 71 of the release 70 may be spaced apart from the rotation axis R (see FIG. 10) of the release 70. Accordingly, when the release 70 rotates, the distal end 71 of the release 70 may come into contact with the third part 343 of the arm 34 to thereby push the third part 343. In other words, the distal end 71 may provide a moment (of force) to the arm 34.

The gasket 72 may be provided at an outside of the release 70. The gasket 72 may seal between the release 70 and the body 10. The gasket 72 may be positioned between the distal end 71 and the knob 73. The gasket 72 may come into contact with the body 10. The gasket 72 may prevent foreign substances from penetrating the body 10 from the outside.

The knob 73 may have a smooth outer surface. A user may operate the knob 73 through an additional structure. The knob 73 may be provided with the stopper 74. When the user operates the knob 73 to rotate the release 70, the stopper 74 may limit a rotation angle of the release 70. The knob 73 may be disposed to face the distal end 71 of the release 70. The knob 73 may be connected to the distal end 71 of the release 70.

The fastening portion 75 may be inserted into the body 10. The release 70 of the door lock device 1 according to this embodiment may have a fastening portion 75 that is fastened to the inside of the body 10 in a snap-fit manner.

The release 70 may have the rotation axis R at its center. The release 70 may rotate about the rotation axis R. A user may use the knob 73 to rotate the release 73.

When power supplied to the solenoid 40 is cut off, since no attractive force exists between the core 41 and the plunger 42, a portion of the second part 412 of the core 41 may move to the inside of the solenoid 40, as shown in FIG. 7A. However, due to residual magnetism of the plunger 42, when the core 41 and the plunger 42 are not separated from each other even after the power supplied to the solenoid 40 has been cut off, the key 80 may not be taken out of the head 20 because the first slider 35 is not separated from the solenoid 40.

In this case, a user may operate (rotate) the release 70, so that a driving force may be transferred to the first slider 35 through the arm 34, causing the first elastic member 51 interposed between the first slider 35 and the plunger 42 to be compressed. Accordingly, the first slider 35 may be separated from the solenoid 40.

Since the force required to compress the first elastic member 51 through the first slider 35 is smaller than the force required to separate the first slider 35 and the plunger 42 from the core 41, a user may operate the release 70 with less force. In addition, deformation or damage between connected parts may be prevented during the transmission of force.

Referring to FIG. 11, the second slider 33 may include a cylinder 331, a notch 332, a recessed portion 333, and a guide 334. The slot 351 of the first slider 35 may include a recessed portion 351*a*.

The cylinder 331 may protrude outward from the second slider 33.

The notch 332 may be formed in a region adjacent to the rod 32. The notch 332 may be provided with the recessed portion 333. A size of the recessed portion 333 may be less than the diameter D2 of the second part 322. The size of the recessed portion 333 may be greater than the diameter D3 of the third part 323. Accordingly, the second slider 33 may suppress the movement of the second part 322. When power is applied to the solenoid 40, the recessed portion 333 may support the lateral surface of the third part 323 of the rod 32.

The guide 334 may be formed on the notch 332. The guide 334 may protrude to an inside of the notch 332. The guide 334 may have an inclined surface so as to guide the rod 32 to the inside of the notch 332.

The recessed portion 351*a* of the first slider 35 may be recessed in a direction intersecting a longitudinal direction of the first slider 35. In particular, when power is applied to the solenoid 40, the recessed portion 351*a* of the first slider 35 may be depressed in a direction opposite to a moving direction of the first slider 35. That is, when the first slider 35 moves toward the solenoid 40 as the power is applied to the solenoid 40, the cylinder 346 of the arm 34 may be placed into the recessed portion 351*a* of the first slider 35.

Referring to FIG. 12, the plunger 42 may include a first end 421, a second end 422, an accommodation space 423, a ring groove 424, and a stopper 425.

The first end 421 of the plunger 42 may be provided with the accommodation space 423 in which the core 41 is accommodated. The second end 422 of the plunger 42 may be inserted into an inner space 357 of the first slider 35. The second end 422 of the plunger 42 may define a distal end of the plunger 42. The second end 422 of the plunger 42 may be provided with the ring groove 424. The stopper 425 may be inserted into the ring groove 424 of the plunger 42. An outer surface of the stopper 425 may slide on an inner wall 356 of the first slider 35.

The stopper 425 may be disposed in the first slider 35 to be installed on the plunger 42. The stopper 425 may be a snap ring. At least a portion of the inside of the stopper 425 may be inserted into the ring groove 424. The stopper 425 may support the first elastic member 51. The stopper 425 may be supported by a stopper 358 of the first slider 35. The stopper 425 may prevent the first elastic member 51 from being separated to an outside of the first slider 35.

The first slider 35 may include an accommodation space 352, stoppers 353, 355, 358, and a flange 354.

The accommodation space 352 of the first slider 35 may accommodate therein the piston 611 of the first terminal assembly 61. The stopper 353 may prevent the separation of the piston 611 accommodated in the accommodation space 352. The stopper 353 may extend in a direction intersecting a moving direction of the piston 611. For example, the stopper 353 may extend in a direction perpendicular to the moving direction of the piston 611.

The flange 354 of the first slider 35 may protrude from an outer surface of the first slider 35. The flange 354 may support the second elastic member 52. The flange 354 may allow the restoring force provided by the second elastic member 52 to be effectively transferred to the first slider 35.

The stoppers 355, 358 may prevent the plunger 42, the first elastic member 51, and the stopper 425, which are positioned in the first slider 35, from being separated to the outside of the first slider 35. The stopper 355 may support the second end 512 of the first elastic member 51. The stopper 425 may support the first end 511 of the first elastic member 51. The stoppers 355, 358 may prevent the plunger 42, the first elastic member 51, and the stopper 425 from being separated in a moving direction of the first slider 35. The stoppers 355, 358 may protrude from the inner wall 356 of the first slider 35 to an inside of the first slider 35. The stoppers 355, 358 and the stopper 425, which is provided on the plunger 42, may be arranged on the longitudinal direction (or moving direction) of the plunger 42. Thus, the stoppers 355, 358 may prevent the plunger 42 and the stopper 425 from being separated to the outside of the first slider 35.

Referring to FIGS. 1 to 12, according to an aspect of the present disclosure, there is provided a door lock device 1 including: a body 10; a solenoid 40 including a bobbin 45 on which a coil 45*c* is wound, and a plunger 42 that is elongated to have a portion exposed to an outside of the solenoid 40 and configured to be magnetized by the coil 45*c* so as to slide inside the bobbin 45, the solenoid 40 being disposed in the body 10; a first slider 35 into which the portion of the plunger 42 exposed to the outside of the solenoid 40 is inserted, the first slider 35 being configured to move in a sliding direction of the plunger 42; and a first elastic member 51 having a first end 511 supported by the plunger 42, and a second end 512 supported by the first slider 35.

According to another aspect of the present disclosure, the door lock device 1 may further include a second elastic member 52 having a first end 521 supported by the solenoid 40, and a second end 522 supported by the first slider 35 to provide an elastic force to the first slider 35.

According to another aspect of the present disclosure, the first elastic member 51 may be disposed between the plunger 42 and the first slider 35 to provide an elastic force to the first slider 35.

According to another aspect of the present disclosure, the plunger 42 may include: a distal end 422 disposed in the first slider 35; and a stopper 425 provided at the distal end 422 of the plunger 42 to slide on an inner wall 356 of the first slider 35. The first elastic member 51 may be disposed in the first slider 35 and may be supported by the stopper 425.

According to another aspect of the present disclosure, the first slider 35 may include a stopper 355, 358 protruding from the inner wall 356 and arranged with the stopper 425 in a longitudinal direction of the plunger 42.

According to another aspect of the present disclosure, the door lock device 1 may further include a release 70 installed at the body 10 so that the first slider 35 is spaced apart from the plunger 42.

According to another aspect of the present disclosure, the door lock device 1 may further include an arm 34 having a first side connected to the first slider 35, and a second side supported by the release 70.

According to another aspect of the present disclosure, the release 70 may include: a distal end 71 extending to an inside of the body 10 and disposed adjacent to the arm 34; and a knob 73 connected to the distal end 71 and providing a rotation axis. The distal end 71 may be spaced apart from the rotation axis R.

According to another aspect of the present disclosure, the door lock device 1 may further include a head 20 mounted on the body 10 and having a slot 211 through which an inside and an outside of the head 20 communicate with each other; a cam 31 configured to rotate on a shaft 25 fixed inside the head 20, the cam 31 having a nose 314 protruding from a peripheral surface of the cam 31; a rod 32 passing through the head 20 and having an end in contact with the peripheral surface of the cam 31, the rod 32 having a lateral surface supported by the head 20; and a second slider 33 connected to the arm 34, the second slider 33 being configured to move in a direction intersecting a longitudinal direction of the rod 32.

According to another aspect of the present disclosure, when power is applied to the solenoid 40, the second slider 33 and the rod 32 may be arranged in the longitudinal direction of the rod 32.

According to another aspect of the present disclosure, the rod 32 may include: a first part 321 in contact with the cam 31; a second part 322 connected to the first part 321; and a third part 323 connected to the second part 322, the third part 323 having a diameter D3 less than a diameter D2 of the second part 322. The second slider 33 may include a recessed portion 333 recessed in a radial direction of the rod 32 in a region adjacent to the rod 32. A size of the recessed portion 333 may be less than the diameter D2 of the second part 322 and greater than the diameter D3 of the third part 323.

According to another aspect of the present disclosure, the second slider 33 may include: a notch 332 recessed in a radial direction of the rod 32 in a region adjacent to the rod 32; and a guide 334 provided on the notch 332 so as to guide the rod 32 to the notch 332.

According to another aspect of the present disclosure, the cam 31 may include a plurality of teeth (311, 312, 313) protruding from the peripheral surface of the cam 31. The plurality of teeth (311, 312, 313) may include: a first tooth 311 spaced apart from the slot 211 in a direction intersecting an opening direction of the slot 211; and a second tooth 312 aligned with the slot 211 in the opening direction of the slot 211. When a key 80 is inserted through the slot 211, the key 80 and the first tooth 311 may come into contact with each other to cause the cam 31 to rotate, so that the second tooth 312 may be engaged with the key 80.

According to another aspect of the present disclosure, the head 20 may include: a spring 26 through which the shaft 25 passes, the spring 26 connecting the cam 31 and the shaft 25; and a stopper 23 having a protrusion 231 engaged with the second tooth 312, the stopper 23 being fitted to the spring 26. When the key 80 is inserted into the head 20 through the slot 211, the stopper 23 may move in an axial direction of the shaft 25.

Certain embodiments or other embodiments of the present disclosure described above are not mutually exclusive or distinct from each other. Any or all elements of the embodiments of the present disclosure described above may be combined or combined with each other in configuration or function.

For example, a configuration "A" described in one embodiment of the present disclosure and the drawings, and a configuration "B" described in another embodiment of the present disclosure and the drawings may be combined with each other. Namely, although the combination between the configurations is not directly described, the combination is possible except in the case where it is described that the combination is impossible.

The above detailed description should be construed in all aspects as illustrative and not restrictive. The scope of the disclosure should be determined by reasonable interpretation of the appended claims, and all changes coming within the equivalency range of the disclosure are intended to be embraced in the scope of the disclosure.

The invention claimed is:

1. A door lock device comprising:
   - a body;
   - a solenoid comprising a bobbin on which a coil is wound, and a plunger that is elongated to have a portion exposed to an outside of the solenoid and configured to be magnetized by the coil so as to slide inside the bobbin, the solenoid being disposed in the body;
   - a first slider into which the portion of the plunger exposed to the outside of the solenoid is inserted, the first slider being configured to move in a sliding direction of the plunger;
   - a first elastic member having a first end supported by the plunger, and a second end between the first end and the bobbin supported by the first slider; and
   - a second elastic member disposed between the first end of the first elastic member and the bobbin, and having a first end supported by the first slider and a second end supported by the solenoid.

2. The door lock device of claim 1, wherein the first elastic member is disposed between the plunger and the first slider to provide an elastic force to the first slider.

3. The door lock device of claim 2, wherein the plunger comprises:

a distal end disposed in the first slider; and a first stopper provided at the distal end of the plunger to slide on an inner wall of the first slider, and wherein the first elastic member is disposed in the first slider and is supported by the first stopper.

4. The door lock device of claim 3, wherein the first slider comprises a second stopper that protrudes from the inner wall, the second stopper being arranged with the first stopper in a longitudinal direction of the plunger.

5. The door lock device of claim 1, further comprising a release installed at the body so that the first slider is spaced apart from the plunger.

6. The door lock device of claim 5, further comprising an arm having a first side connected to the first slider, and a second side supported by the release.

7. The door lock device of claim 6, wherein the release comprises:

a distal end extending to an inside of the body and disposed adjacent to the arm; and a knob connected to the distal end and providing a rotation axis, and wherein the distal end is spaced apart from the rotation axis.

8. The door lock device of claim 6, further comprising:

a head mounted on the body and having a slot through which an inside and an outside of the head communicate with each other;

a cam configured to rotate on a shaft fixed inside the head, the cam having a nose protruding from a peripheral surface of the cam;

a rod passing through the head and having an end in contact with the peripheral surface of the cam, the rod having a lateral surface supported by the head; and a second slider connected to the arm, the second slider being configured to move in a direction intersecting a longitudinal direction of the rod.

9. The door lock device of claim 8, wherein, when power is applied to the solenoid, the second slider and the rod are arranged in the longitudinal direction of the rod.

10. The door lock device of claim 8, wherein the rod comprises:

a first part in contact with the cam;

a second part connected to the first part; and a third part connected to the second part, the third part having a diameter less than a diameter of the second part, wherein the second slider comprises a recessed portion recessed in a radial direction of the rod in a region adjacent to the rod, and wherein a size of the recessed portion is less than the diameter of the second part and greater than the diameter of the third part.

11. The door lock device of claim 8, wherein the second slider comprises:

a notch recessed in a radial direction of the rod in a region adjacent to the rod; and a guide provided on the notch so as to guide the rod to the notch.

12. The door lock device of claim 8, wherein the cam comprises a plurality of teeth protruding from the peripheral surface of the cam, wherein the plurality of teeth comprises:

a first tooth spaced apart from the slot in a direction intersecting an opening direction of the slot; and a second tooth aligned with the slot in the opening direction of the slot, and wherein, when a key is inserted through the slot, the key and the first tooth come into contact with each other to cause the cam to rotate, so that the second tooth is engaged with the key.

13. The door lock device of claim 12, wherein the head comprises:

a spring through which the shaft passes, the spring connecting the cam and the shaft; and a stopper having a protrusion engaged with the second tooth, the stopper being fitted to the spring, and wherein, when the key is inserted into the head through the slot, the stopper is configured to move in an axial direction of the shaft.

14. The door lock device of claim 1, wherein the first elastic member provides a first elastic force to the first slider, and wherein the second elastic member provides a second elastic force opposite to the first elastic force to the first slider.

15. A door lock device comprising:

a body;

a solenoid comprising a bobbin on which a coil is wound, and a plunger that is elongated to have a portion exposed to an outside of the solenoid and configured to be magnetized by the coil so as to slide inside the bobbin, the solenoid being disposed in the body;

a first slider into which the portion of the plunger exposed to the outside of the solenoid is inserted, the first slider being configured to move in a sliding direction of the plunger;

a first elastic member having a first end supported by the plunger, and a second end supported by the first slider; and a release installed at the body so that the first slider is spaced apart from the plunger.

16. The door lock device of claim 15, further comprising an arm having a first side connected to the first slider, and a second side supported by the release.

17. The door lock device of claim 16, wherein the release comprises:

a distal end extending to an inside of the body and disposed adjacent to the arm; and a knob connected to the distal end and providing a rotation axis, and wherein the distal end is spaced apart from the rotation axis.

* * * * *